United States Patent [19]
Poole et al.

[11] Patent Number: 6,037,710
[45] Date of Patent: Mar. 14, 2000

[54] MICROWAVE SEALING OF FLAT PANEL DISPLAYS

[75] Inventors: H. Joe Poole, Oxnard; Paul N. Ludwig, Livermore, both of Calif.

[73] Assignee: Candescent Technologies, Inc., San Jose, Calif.

[21] Appl. No.: 09/069,893

[22] Filed: Apr. 29, 1998

[51] Int. Cl.⁷ .............................. H01J 29/00; H01J 9/02; B32B 31/24
[52] U.S. Cl. ........................... 313/422; 313/495; 445/24; 445/25; 156/273.5
[58] Field of Search ..................................... 313/422, 309, 313/495, 496; 156/273.5, 275.5, 275.7; 445/24, 25

[56] References Cited

U.S. PATENT DOCUMENTS

| | | |
|---|---|---|
| 5,618,216 | 4/1997 | Potter ........................................ 445/24 |
| 5,649,847 | 7/1997 | Haven ........................................ 445/24 |
| 5,653,838 | 8/1997 | Hwang et al. ........................... 156/104 |
| 5,804,801 | 9/1998 | Lauf et al. ............................. 156/272.2 |

*Primary Examiner*—Nimeshkumar D. Patel
*Assistant Examiner*—Joseph Williams
*Attorney, Agent, or Firm*—Wagner, Murabito & Hao LLP

[57] ABSTRACT

A flat panel display and a method for forming a flat panel display. In one embodiment, the flat panel display includes a sealed interior region. The seal material is placed between a faceplate and a backplate. The seal material is heated using microwave energy. The microwave energy melts the seal material, forming a sealed interior region. The flat panel display is evacuated using an evacuation device that is then sealed off. This results in a flat panel display that is hermetically sealed.

30 Claims, 9 Drawing Sheets

MICROWAVE SEALING OF FLAT PANEL DISPLAYS

TECHNICAL FIELD

The present claimed invention relates to the field of flat panel displays. More specifically, the present claimed invention relates to a flat panel display and methods for forming a flat panel display having a seal formed using a seal material.

BACKGROUND ART

A Cathode Ray Tube (CRT) display generally provides the best brightness, highest contrast, best color quality and largest viewing angle of prior art displays. CRT displays typically use a layer of phosphor that is deposited on a thin glass faceplate. These CRTs generate a picture by using one to three electron beams that generate electrons which are scanned across the phosphor in a raster pattern. The phosphor converts the electron energy into visible light so as to form the desired picture. However, prior art CRT displays are large and bulky due to the large vacuum bottles that enclose the cathode and extend from the cathode to the faceplate of the display. Therefore, typically, other types of display technologies such as active matrix liquid crystal display, plasma display and electroluminiscent display technologies have been used in the past to form thin displays.

Recently, a thin flat panel display (FPD) has been developed which uses the same process for generating pictures as is used in CRT devices. These flat panel displays use a backplate including a matrix structure of rows and columns of electrodes. One such flat panel display is described in U.S. Pat. No. 5,541,473, titled GRID ADDRESSED FIELD EMISSION CATHODE, by Duboc, Jr. et al., and filed Feb. 1, 1993 which is incorporated herein by reference as background material. Typically, the backplate is formed by depositing a cathode structure (electron emitting) on a glass plate. The cathode structure includes emitters that generate electrons. The backplate typically has an active area within which the cathode structure is deposited. Typically, the active area does not cover the entire surface of the glass plate, leaving a thin strip around the edges of the glass plate. Traces extend through the thin strip to allow for connectivity to the active area.

Prior art flat panel displays include a thin glass faceplate having one or more layers of phosphor deposited over the interior surface thereof. The faceplate is typically separated from the backplate by about 1 millimeter. The faceplate includes an active area within which the layer (or layers) of phosphor is deposited. A thin strip that does not contain phosphor extends from the active area to the edges of the glass plate. The faceplate is attached to the backplate using a glass frit seal. This seal is formed by melting glass frit in a high temperature heating step. This forms an enclosure that is evacuated so as to produce a vacuum between the active area of the backplate and the active area of the faceplate. Individual regions of the cathode are selectively activated to generate electrons which strike the phosphor so as to generate a display within the active area of the faceplate. These flat panel displays have all of the advantages of conventional CRTs but are much thinner.

In prior art fabrication processes, a hollow evacuation tube is placed such that it extends across the thin strip of the backplate. Typically a glass or copper tube is used as the evacuation tube (also referred to as a pump port). A thin layer of glass frit is then deposited around the backplate such that the glass frit surrounds the active area of the backplate. The enclosure is only interrupted by the evacuation tube that extends across a gap in the layer of glass frit.

The faceplate is then placed over the backplate such that the active area of the faceplate is aligned with the active area of the backplate. The resulting flat panel display assembly is then placed in an oven where a high temperature process step is performed so as to melt the frit. The glass frit forms a seal between the faceplate and the backplate as it melts, forming an enclosure into which the evacuation tube extends. Typically, a temperature of about 400 degrees centigrade is required to melt the glass frit.

The flat panel display assembly is then removed from the oven and a vacuum hose is attached to the evacuation tube. Any gas within the enclosure is then removed through the evacuation tube. The evacuation tube is then sealed off and the vacuum hose is removed. The resulting flat panel display has a sealed enclosure which is under a vacuum.

Other prior art processes use an auxiliary chamber for forming a vacuum within the flat panel display. The auxiliary chamber is a structure that is formed on the bottom of the backplate surrounding the opening in the backplate. The auxiliary chamber includes an exhaust port that is typically made of glass. The auxiliary chamber exhaust port is coupled to a vacuum hose for evacuating the gas inside of the flat panel display. An auxiliary chamber is used in conjunction with a backplate which has an opening formed within it. When an auxiliary chamber is used, frit is disposed completely around the circumference of the active area of the backplate. Upon heating the frit, a seal is formed between the faceplate and the backplate that completely encloses the active areas of the faceplate and the active areas of the backplate. The opening in the backplate is disposed within the area enclosed by the frit seal. Once the flat panel display is evacuated, a localized heat source is used to seal the exhaust port.

The sealing process is time consuming and expensive due to the numerous fabrication steps. In addition, such prior art sealing processes subject the entire flat panel display to very high temperatures which are required to melt the glass frit. The high temperatures required during the heating process damage the emitters so as to degrade the cathode. High temperature processes induce stress in the surfaces of the faceplate and the backplate due to temperature non-uniformities. Moreover, the high temperatures and the time at temperature increase the volume of gas outgassed from the materials used in the flat panel display.

Some prior art approaches attempt to reduce outgassing in prior art flat panel display fabrication processes by the use of materials that have a low outgassing rate and that have a low vapor pressure. Thus, only metals, glasses, ceramics, and select specially processed polymers are typically used within flat panel displays. These materials are typically processed by baking (at several hundred degrees centigrade) and are electronically or otherwise scrubbed in order to remove adhered molecules. However, only some of the outgassing is eliminated by such processes. Typically, a getter is used to minimize damage resulting from outgassing. The getter absorbs some of the chemicals released by outgassing. However, the getter only absorbs some of the outgassed particles, allowing the remainder of the damaging outgassed particles to possibly interact with the active surfaces of the flat panel display. The outgassed contaminates degrade the emitter surface causing electron emissions to be temporally unstable and to be generally reduced. In addition, ions formed through the collision of electrons with gas molecules can be accelerated into the emitter tips and may degrade their emission. Plasma formed in the same manner can short emitter tips to the overlying gate and can cause arcing at high field regions in the display. Thus, outgassing interferes with the operation of the cathode, resulting in reduced picture quality.

Alternate prior art heating methods for forming a seal between the faceplate and the backplate include the use of lasers that are focused on the glass frit. Typically, such methods heat the glass frit to temperatures of more than 400 degrees centigrade. However, since the heat is localized, the damage to the active areas is reduced. Damage resulting from oxidation is typically reduced by performing the heating process in an inert gas environment such as nitrogen). However, in order to prevent the glass of the faceplate and the backplate from cracking or breaking from the sudden temperature increase, the flat panel display must be preheated in an oven to the seal material glass transition temperature (typically 300 to 325 degrees centigrade).

In one prior art laser-sealing process, frit is disposed on the faceplate such that a gap is formed between the top of the frit and the bottom of the backplate. This gap is typically about one to two mils. The flat panel display assembly is then aligned and tacked so as to hold the faceplate and the backplate in their proper alignment. Typically, four tacks are used, one in each corner of the flat panel display assembly. A laser is then used to melt the frit. The heat of the laser melts the frit locally and causes the frit to expand such that the frit contacts the backplate, wetting the surface of the backplate and forming a "bead". The laser is moved, drawing the bead around the surface of the frit until the desired seal is formed. However, as the bead moves across the area to be sealed, friction from the movement of the bead can cause misalignment between the faceplate and the backplate, causing reduced image quality (sometimes resulting in a defective product). Additionally, the movement of the bead can cause overall stress across the entire flat panel display.

In laser heating processes, stress fracturing results from the torsional forces due to the moving bead and the cooler glass. More particularly, as the glass frit reaches a molten state, the glass plate of the faceplate is still relatively cold (though there is a small amount of radiative heating from the hot frit surface). When the molten glass frit surface touches the relatively cold glass, the quality of the joint suffers from the cooling of the joint surface by the glass of the faceplate. Stress fracturing reduces the life expectancy of the resulting product (in some cases, life expectancy is reduced to as little as few weeks). In order to reduce stress fracturing, additional processing steps are required. One such additional processing step consists of a pre-heating step that heats the flat panel display assembly to the required temperature. Such pre-heating can result in cathode degradation, stress the surfaces of the faceplate and the backplate, and cause outgassing.

Flat panel display fabrication processes are expensive and time consuming due in large part to the number of complex steps required in the bonding process. For example, when a two-step laser-heating process is used to seal the glass frit first to the faceplate and then to the backplate, the process typically takes approximately thirty minutes for a five inch square substrate (15 minutes for each side). Moreover, the outgassing and heat generated defects decrease yield and increase overall manufacturing cost. In addition, the numerous process steps take up a significant amount of time so as to cause low throughput rates.

Thus, a need exists for a flat panel display and a method for forming a flat panel display that will increase yield and throughput of manufacturing. A further need exists for a flat panel display and a method for forming a flat panel display that does not damage the active areas during the bonding process. In particular, a need exists for a flat panel display and a method for forming a flat panel display that minimizes outgassing and residual stress. A further need exists for a flat panel display and a method for forming a flat panel display which minimizes fabrication process time and which reduces manufacturing cost. The present invention meets the above needs.

DISCLOSURE OF THE INVENTION

The present invention provides a flat panel display that uses microwave radiation to form a seal between a faceplate and a backplate. The microwave radiation heats the display assembly so as to form the desired seal.

In one embodiment of the present invention a flat panel display is disclosed which includes a faceplate and a backplate, that are attached using seal material. The backplate is fabricated by forming a cathode on an active area of a glass plate. The faceplate is fabricated by depositing luminescent material within an active area formed on a glass plate. In one embodiment, the flat panel display includes an evacuation device that allows for the evacuation of the flat panel display. The evacuation device is preferably either an auxiliary chamber or an evacuation tube.

The flat panel display of the present invention is fabricated by placing seal material on the backplate such that the seal material surrounds the active area of the backplate. The faceplate is then placed over the backplate such that the seal material is disposed between the faceplate and the backplate. The backplate, the faceplate, the seal material, and the evacuation device are placed into a chamber that is filled with a nonreactive gas. The seal material is heated using microwave radiation so as to form a seal that attaches the faceplate to the backplate. Thus, a seal is formed around the periphery of the active areas of the faceplate and the backplate. The evacuation device is then used to evacuate the flat panel display and seal the flat panel display in an evacuated state.

The flat panel display of the present invention and the method of fabrication of a flat panel display of the present invention has reduced outgassing due to the elimination of the conventional heating step(s) for melting the seal material. In addition, the use of microwave radiation to melt the seal material is much quicker than prior art processes for melting seal materials. Thus, the flat panel display and method for forming a flat panel display of the present invention results in fewer defects and an increased yield. Moreover, process steps are eliminated, saving time, increasing throughput, and reducing manufacturing costs.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
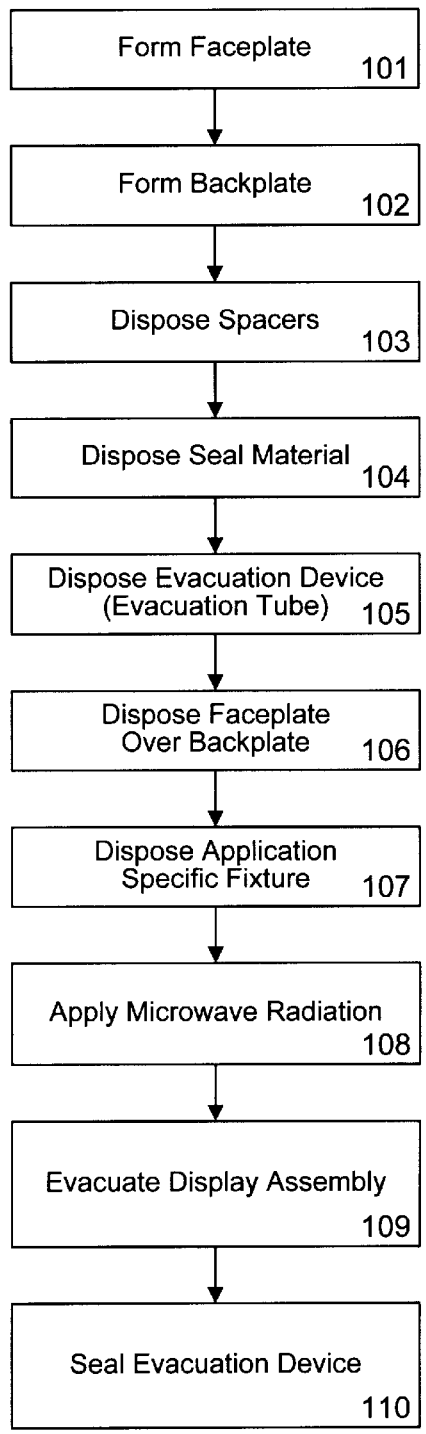
FIG. 1 is a diagram illustrating steps associated with the formation of a flat panel display in accordance with the present claimed invention.
Figure 2:
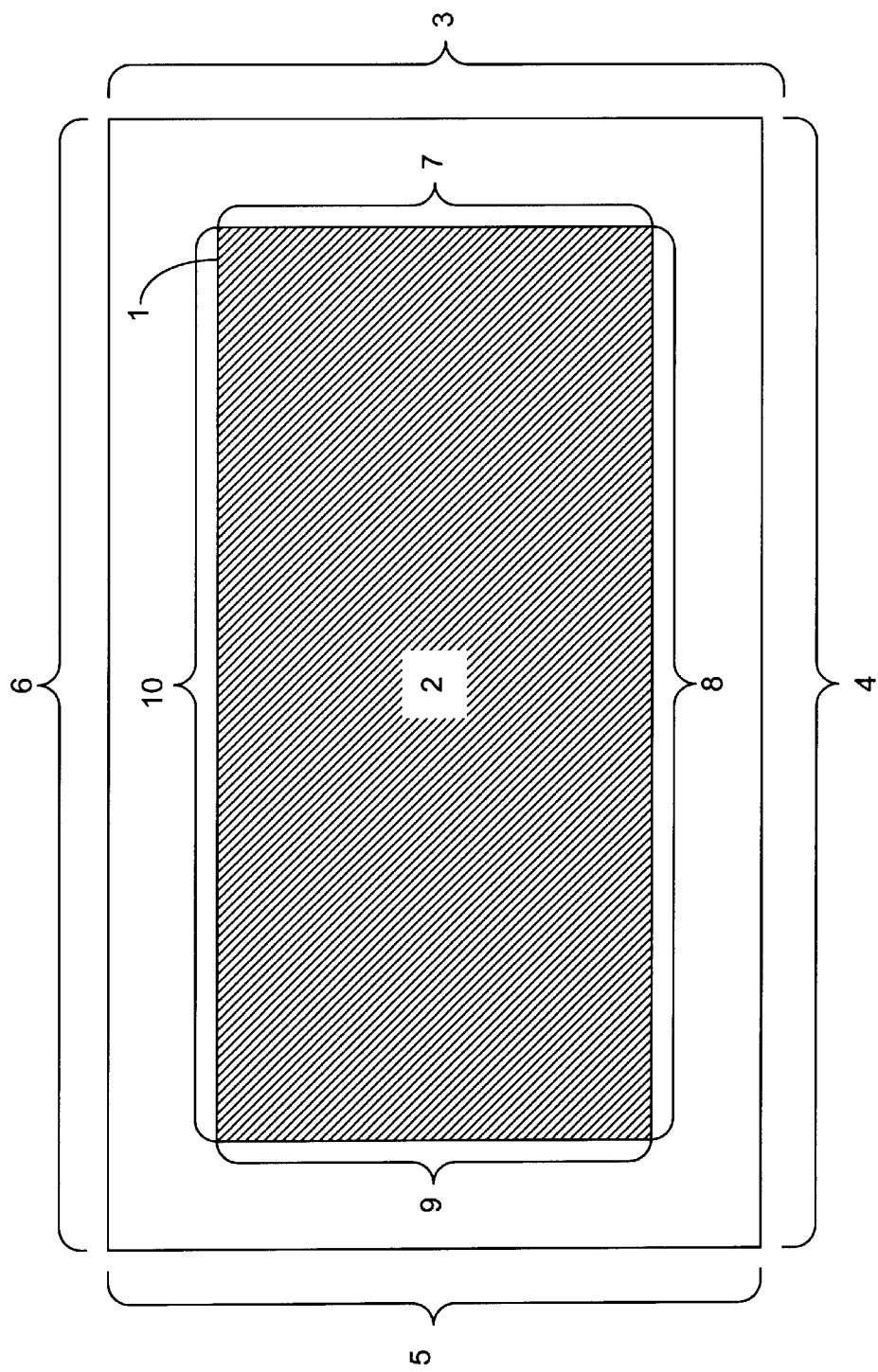
FIG. 2 is a top view illustrating a faceplate in accordance with the present claimed invention.

Referring now to FIG. 1, the steps for forming a display in accordance with one embodiment of the present invention are shown. First, as shown by step 101, a faceplate which includes an active area is formed. In one embodiment of the present invention, a faceplate is formed by depositing phosphor onto a glass plate. FIG. 2 shows a faceplate 1 having side surfaces 3–6. Phosphor, not shown, is deposited so as to form active area 2. Active area 2 does not cover the entire surface area of faceplate 1. That is, side surfaces 7–10 of active area 2 are separated from side surfaces 3–6 of faceplate 1.

Figure 3:
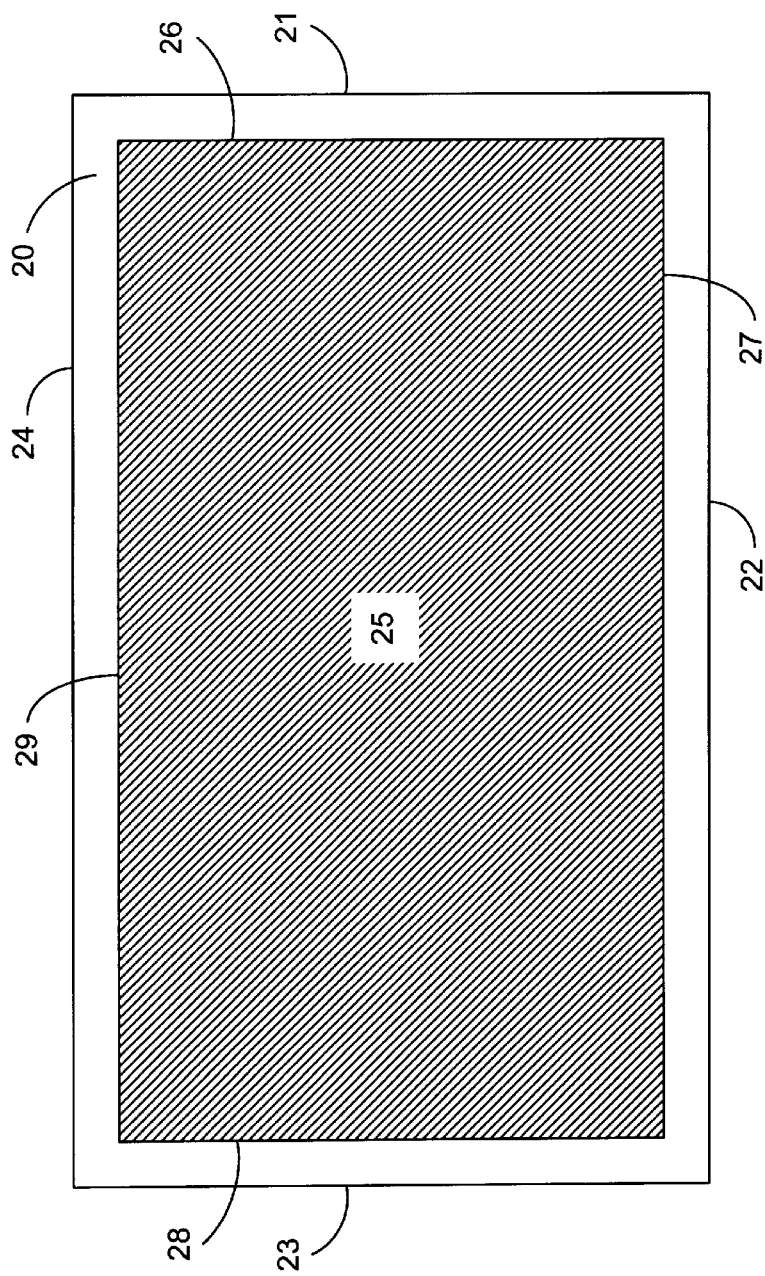
FIG. 3 is a top view illustrating a backplate in accordance with the present claimed invention.

Continuing with FIG. 1, as shown by step 102, a backplate is formed. In the embodiment shown in FIG. 3, backplate 20 is shown to include side surfaces 21–24 and active area 25. Active area 25 is bounded by side surfaces 26–29. In one embodiment of the present invention, backplate 20 is a glass plate onto which successive layers of material have been deposited so as to form cathodic structures within active area 25. These cathodic structures include emitters that emit electrons.

Referring still to FIG. 1, spacers are then deposited onto the backplate as shown by step 103. In the embodiment shown in FIG. 4, spacers 34 are attached to backplate 20 near each corner of backplate 20. However, the number and location of spacers may be altered, as necessary, to accommodate the size and shape of the display to be formed.

Referring again to FIG. 1, seal material is deposited around the active area of the faceplate as shown by step 104. However, when an evacuation tube is used as an evacuation device, seal material is not disposed entirely around the circumference of the active area. A small region is left uncovered so as to allow for the placement of the evacuation tube.

Figure 4:
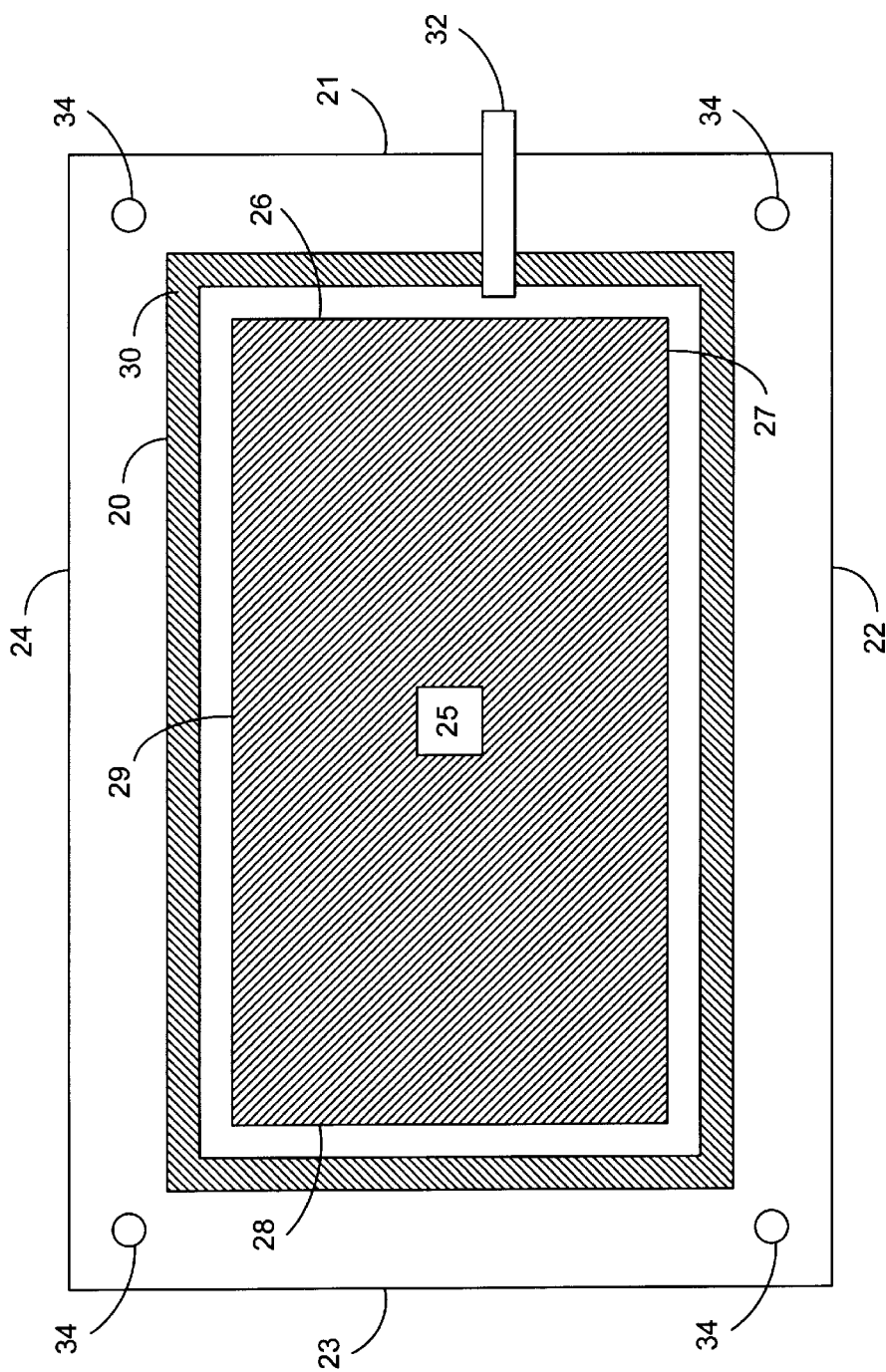
FIG. 4 is a top view illustrating a backplate having seal material, spacers, and an evacuation tube deposited thereover in accordance with the present claimed invention.

In the embodiment shown in FIG. 4, seal material 30 is deposited outside of active area 25 between side surfaces 26–29 and side surfaces 21–24. Traces that extend out from the active area (not shown) are covered by a dielectric layer to prevent shorting where they cross seal material 30. In one embodiment of the present invention, seal material 30 is glass frit that is deposited using a nozzle. Alternatively, seal material 30 may be deposited using screen printing. Alternatively, seal material 30 is formed as a frame or arrangement of bars prior to deposition.

Continuing with FIG. 1, an evacuation tube is then placed over the backplate as shown by step 105. With reference back to FIG. 4, evacuation tube 32 overlies the small region that is left uncovered by frit 30.

Figure 5:
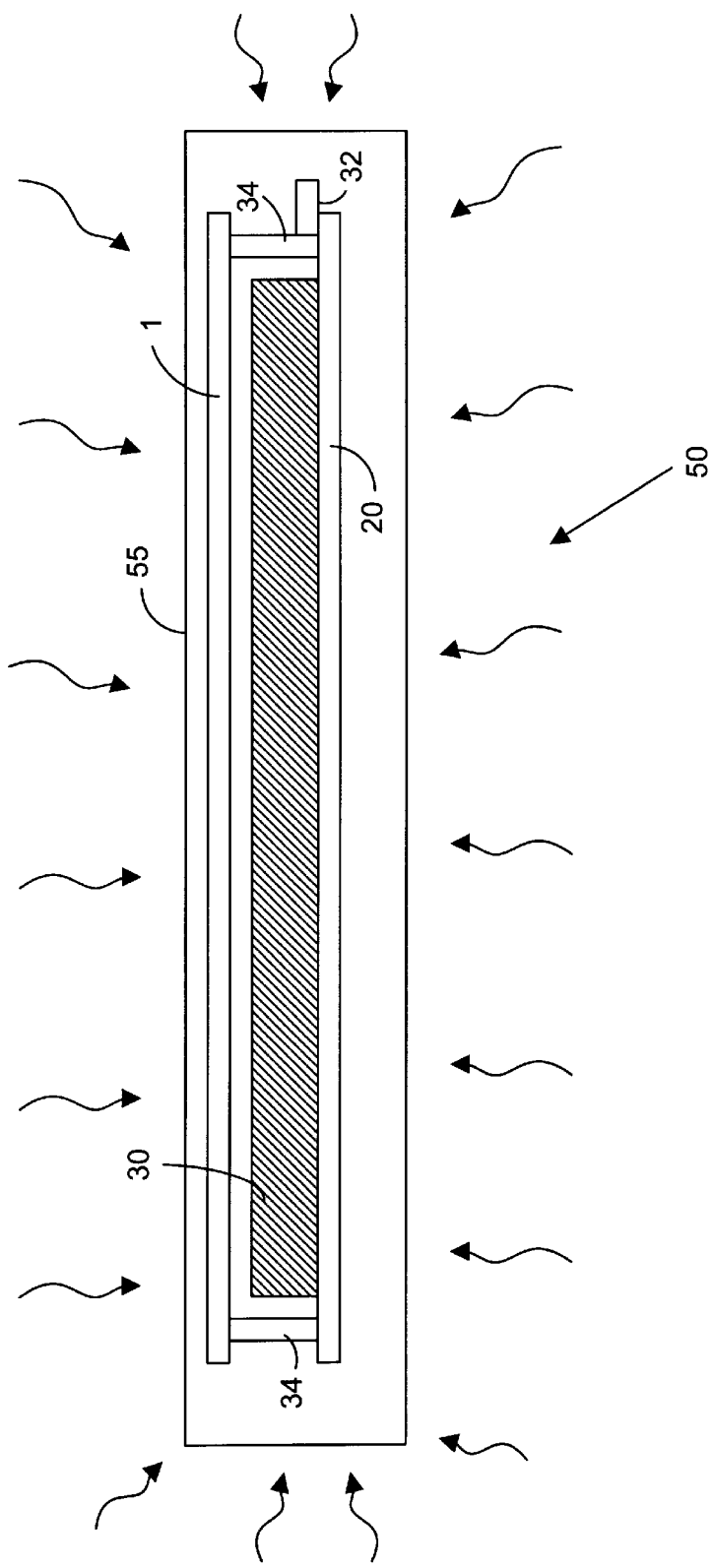
FIG. 5 is a side view of microwave radiation being applied to a flat panel display in accordance with the present claimed invention.

The faceplate is then placed over the backplate as shown by step 106 of FIG. 1. The placement of the faceplate over the backplate is performed so as to align active area 2 of FIG. 2 with active area 25 of FIGS. 3–4. FIG. 5 shows faceplate 1 placed over backplate 20 such that seal material 30 is disposed between backplate 20 and faceplate 1, forming display assembly 50. Spacers 34 maintain the desired spacing between faceplate 1 and backplate 20.

As shown by step 107 of FIG. 1, display assembly 50 is shielded by placing application specific fixture 55 around display assembly 50. In one embodiment, application specific fixture 55 surrounds display assembly 50 so as to promote uniform heating of the desired areas of the display. By selectively altering the microwave radiation absorption characteristics of regions of application specific fixture 55, the heating may be precisely controlled. In one embodiment, the application specific fixture 55 is a box made of glass or plastic of varying thickness such that radiation is selectively absorbed to shield portions of faceplate 1 and backplate 2 from microwave radiation and such that radiation is selectively allowed to pass to heat seal material 30.

Microwave energy is then applied to the assembly as is shown by step 108 of FIG. 1. In one embodiment of the present invention heat is applied by engaging a microwave energy source which is connected via waveguide or related power delivery device to a process chamber. FIG. 5 shows microwave energy being applied to flat panel display assembly 50. The heat melts the seal material and bonds the faceplate to the backplate. In this embodiment, a microwave frequency of between 10 gigahertz (GHz) and 300 GHz is applied. However, better performance is observed at frequencies of 20 GHz and above. In one embodiment, a gyrotron (a scattered radiation source) is used to supply 10–100 kilowatts (kW) of energy at a frequency of 30 GHz for a time period substantially less than the typical 20–30 minutes required in the prior art. The process chamber preferably includes mode homogenizing hardware for providing uniform microwave field intensity.

In one embodiment of the present invention, the application of microwave radiation is conducted in an inert gas environment. This is accomplished by placing the display assembly into a microwave radiation chamber and injecting an inert gas into the microwave radiation chamber (e.g. Nitrogen). Alternatively, the display assembly is placed in a vacuum.

Figure 6:
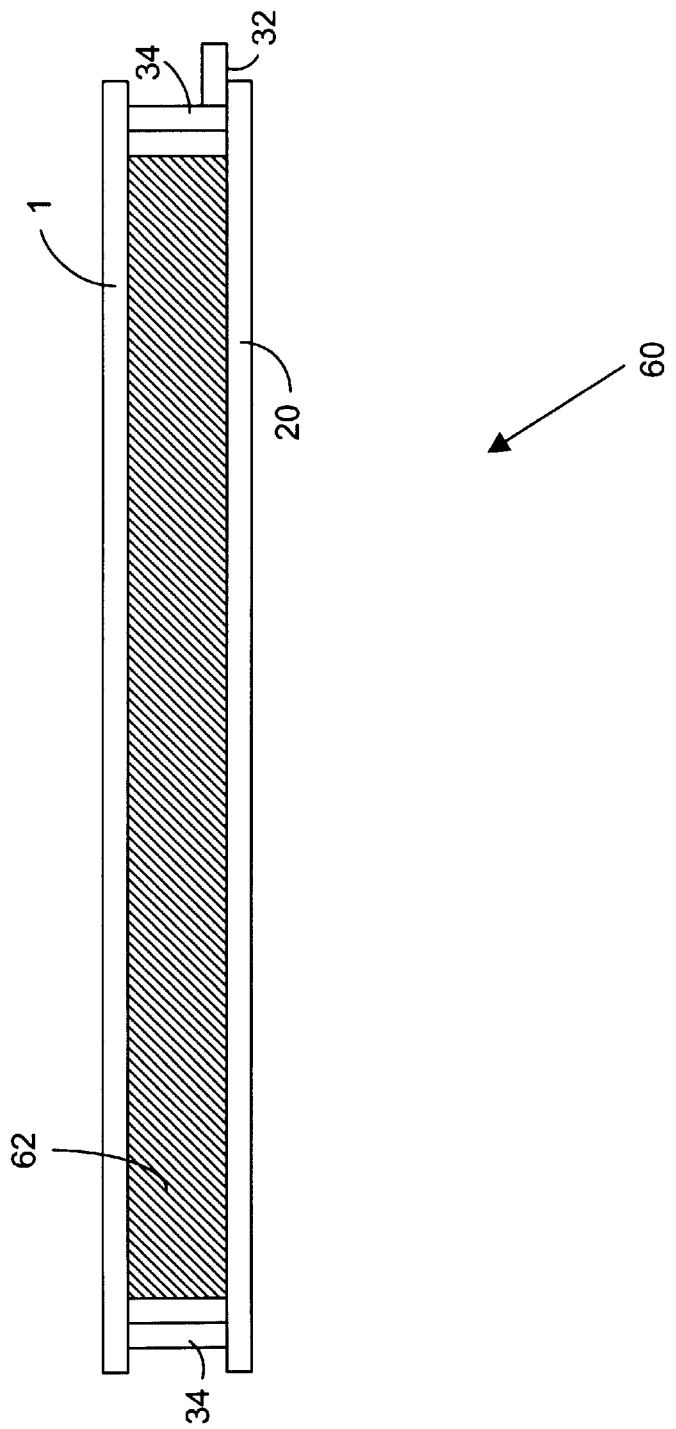
FIG. 6 is a side view of a flat panel display that includes a seal in accordance with the present claimed invention.

Continuing with FIG. 1, the seal material expands as it melts and wets the surfaces of both the faceplate and the backplate. The seal material is then allowed to cool so as to produce an airtight seal. In one embodiment of the present invention, the seal material has a thickness of approximately 28–38 mils prior to heating, giving a thickness of 30–40 mils after completion of the heating step. The melting of the seal material forms an enclosure that is hermetically sealed. FIG. 6 shows display assembly 60 after effected a seal 62 by melting seal material 30 of FIGS. 1–5. Seal 62 extends between the bottom surface of faceplate 1 to the top surface of backplate 2, forming a seal therebetween.

Continuing with FIG. 1, the display assembly is then evacuated, as shown by step 109, by applying a suction to the evacuation device. In the embodiments shown in FIGS. 4–6, an evacuation hose is connected to evacuation tube 32 and suction is applied so as to form a vacuum. As shown by step 110, the evacuation device is then sealed. In the embodiment shown in FIGS. 4–6, this step is performed by applying heat locally to evacuation tube 32. The heat melts evacuation tube 32 and forms a hermetically sealed enclosure.

Figure 7:
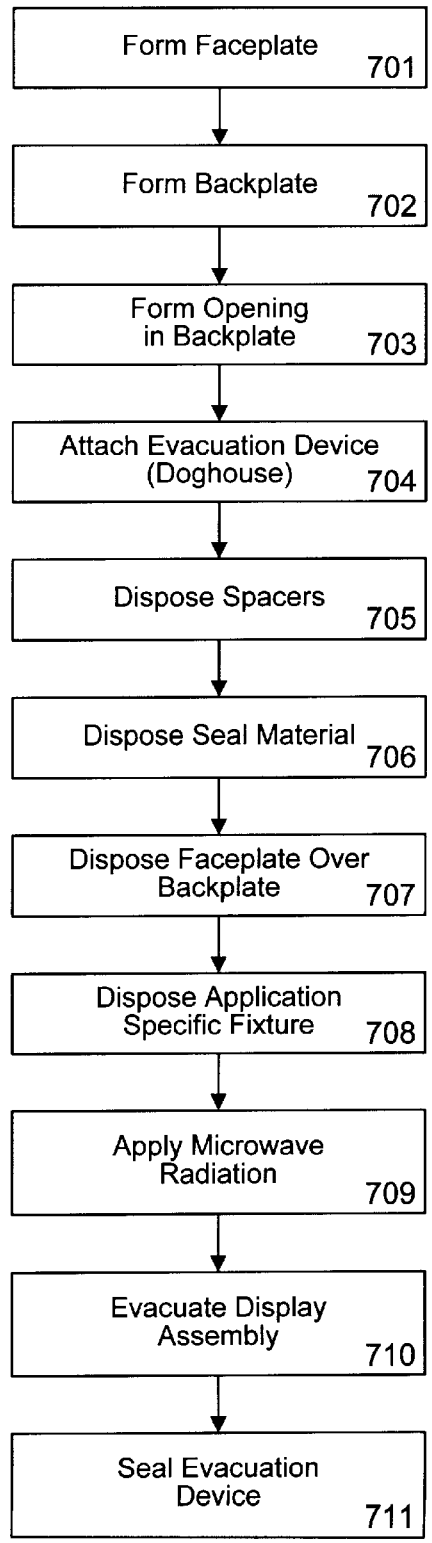
FIG. 7 is a diagram illustrating steps associated with the formation of a flat panel display in accordance with a second embodiment of the present claimed invention.
Figure 8:
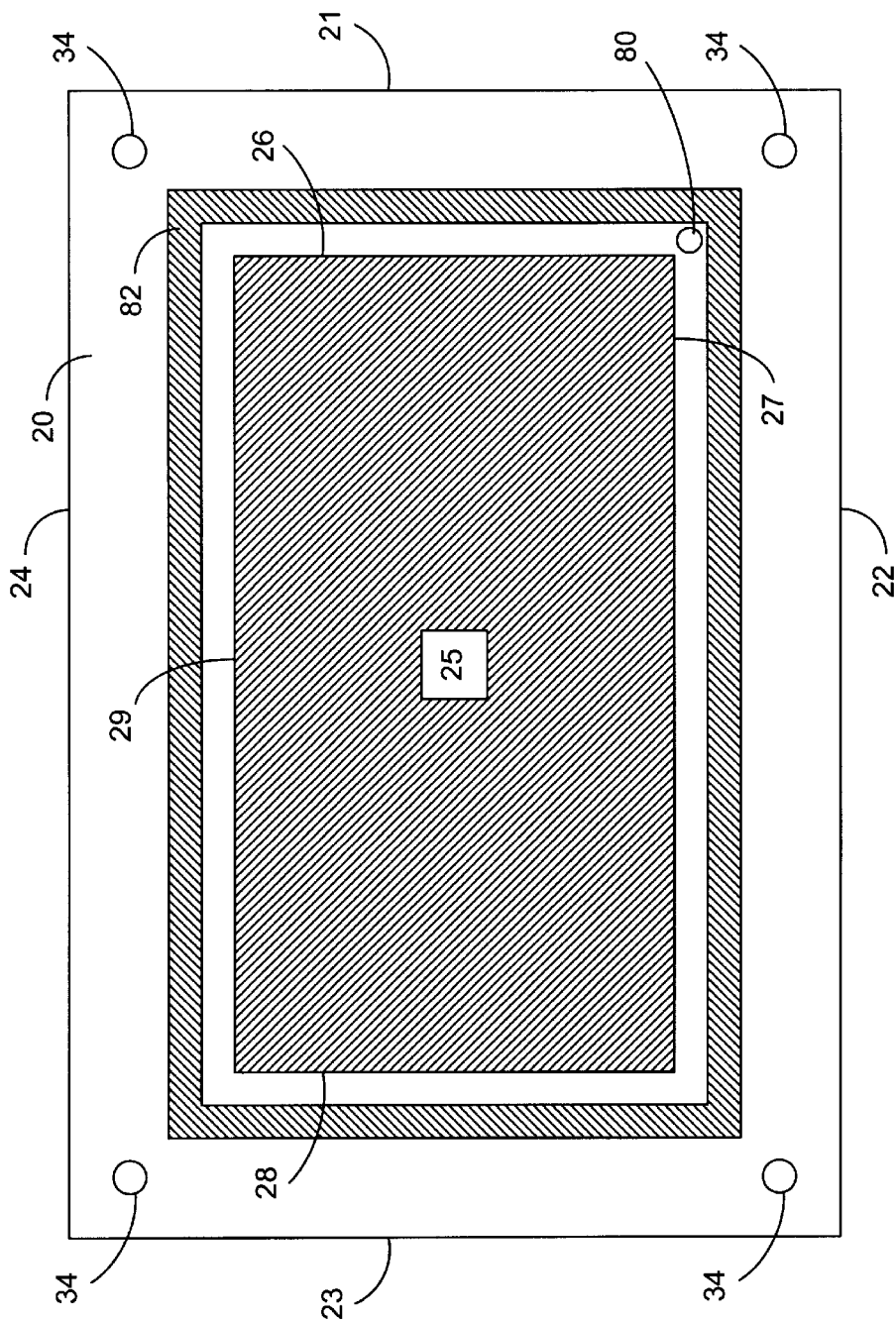
FIG. 8 is a top view illustrating a backplate having an opening formed therein, and having seal material and spacers deposited thereon, in accordance with one embodiment of the present claimed invention.
Figure 9:
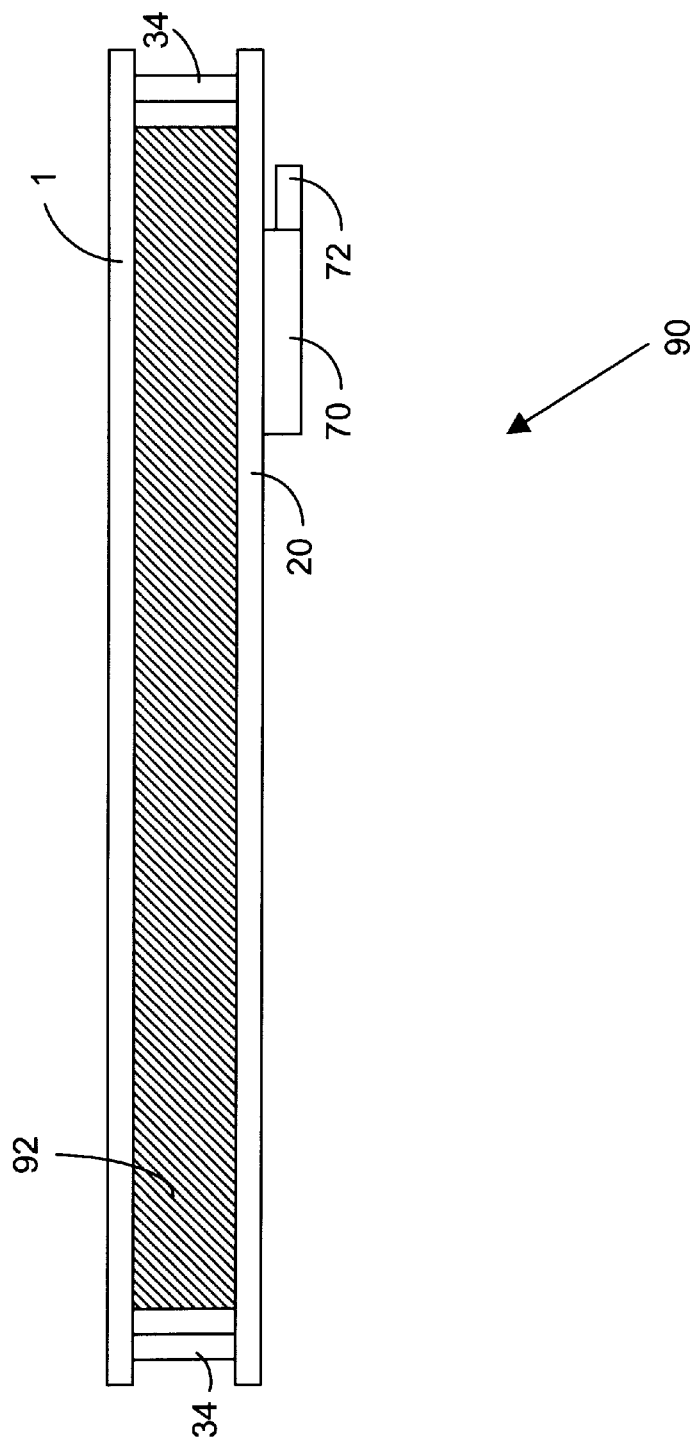
FIG. 9 is a side view of a flat panel display that includes an auxiliary chamber in accordance with the present claimed invention.

In an alternate embodiment of the present invention shown in FIGS. 7–9, an auxiliary chamber is used as an evacuation device. Referring now to FIG. 7, when an auxiliary chamber is used for evacuating a display assembly, a faceplate is formed as shown by step 701 and a backplate is formed as shown by step 702. An opening is formed within the backplate as shown by step 703. This opening may be formed in the glass plate prior to the formation of an active area on the glass plate or may be formed thereafter. FIG. 8 shows opening 80 formed in backplate 20. In one embodiment, the opening is formed by drilling a hole into the backplate. An auxiliary chamber is attached to the backplate as shown by step 704. Either an auxiliary chamber which includes an exhaust port or an auxiliary chamber which does not include an exhaust port may be used. Referring to FIG. 9, auxiliary chamber 70 is aligned over opening 80 of FIG. 8. In the embodiment shown in FIG. 8, auxiliary chamber 70 includes exhaust port 72. Spacers are then deposited as shown by step 705. FIGS. 8–9 show spacers 34 which provide the desired spacing between faceplate 1 and backplate 20. As previously discussed, the number and location of spacers may be altered, as necessary, to accommodate the size and shape of the display to be formed.

Continuing with FIG. 7, seal material is then disposed as shown by step 706. In this embodiment seal material is disposed completely around the perimeter of the active area. FIG. 8 shows backplate 20 that has seal material 82 disposed completely around active area 25. The faceplate is disposed over the backplate, process specific fixturing is placed over the faceplate, and microwave radiation is applied as shown by steps 707–709.

Referring now to FIG. 9, this results in a display assembly 90 that has a seal 92 surrounding the active areas of faceplate 1 and backplate 20.

Referring still to FIG. 7, the display assembly is evacuated as shown by step 710. In the embodiment shown in FIGS. 8–9, the display assembly is evacuated by applying suction to exhaust port 72. The display assembly is then sealed as shown by step 711. In the embodiment shown in FIGS. 7–8 the sealing process is performed by heating exhaust port 72. In one embodiment, the heating process is performed by applying a localized heat source to exhaust port 72. This forms a hermetically sealed enclosure that is under a vacuum.

Other process steps could also be performed as required. In one embodiment, a low temperature curing step is used to accelerate outgassing at a low temperature. In this embodiment, a getter is used to absorb the outgassed species. The getter is typically an evaporated metal such as barium, or a non-evaporable getter such as is sold by SAES Getter, S.p.A.

In an alternate embodiment, evacuation is accomplished by sealing the faceplate to the backplate in a vacuum. In this embodiment, no evacuation device is required to obtain an evacuated enclosure. However, in one embodiment, an auxiliary chamber is used which does not include an exhaust port. In this embodiment, a getter is disposed in the auxiliary chamber to absorb the outgassed species.

Though the formation of the display assembly of the present invention is described with reference to the placement of the faceplate over the backplate, the present invention could be assembled starting with the faceplate. In such an embodiment of the present invention, the spacers and the seal material are placed over the faceplate and the backplate is placed over the faceplate.

The use of microwave energy increases the temperature uniformity during the heating step. More specifically, both the seal material and the glass plates of the faceplate and the backplate have comparable absorption when the frequency is at or above 20 GHz. The comparable absorption provides uniform rate of heating of the glass in the faceplate, the glass in the backplate, and the seal material. Higher bond strength results from the use of microwave radiation. When the molten surface of the seal material touches the glass to which it is to seal, the glass is already at a comparable temperature and will not freeze the frit surface upon contact. Thus, stress fracturing is avoided, resulting in higher bond strength and durability. In addition, there is no need to pre-heat the device as is required in prior art processes.

The present invention provides for sealing the backplate to the faceplate much quicker than prior art processes. In addition, the present invention eliminates slow temperature ramp and the larger time at temperature conditions associated with conventional prior art approaches. Thus, outgassing and thermal degradation of the cathode is reduced. Since laser-heating is not required, alignment related defects are reduced and stress fracturing is avoided. This reduces the number of defects and increases yield. In addition, cycle time is reduced and stress on both the faceplate and the backplate is reduced. These factors result in the reduction of fabrication processing time, increased throughput, lower defect rate, and higher quality products. This reduces fabrication costs and results in a higher quality flat panel display.

In an alternate embodiment, microwave energy is directly applied to those portions of the flat panel display that contain seal material. In this embodiment, a microwave energy applicator which produces a localized pattern of microwave energy is used.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

It is claimed:

1. A method for sealing a faceplate including an active area to a backplate having an active area comprising:

disposing seal material between said backplate and said faceplate such that said seal material is placed around said active area of said backplate and around said active area of said faceplate; and applying microwave energy to said seal material such that said seal material melts, bonding said faceplate to said backplate.

2. The method for sealing a faceplate to a backplate of claim 1 further comprising:

placement of application specific fixturing such that portions of said assembly are shielded from said microwave energy.

3. The method for sealing a faceplate to a backplate of claim 1 wherein said step of applying microwave energy further comprises the step of:

applying a microwave energy having a frequency of between 10 gigahertz and 300 gigahertz to said assembly.

4. The method for sealing a faceplate to a backplate of claim 1 wherein said step of applying microwave energy further comprises the step of:

applying a microwave energy having a frequency of about 20–30 gigahertz to said assembly.

5. The method for sealing a faceplate to a backplate of claim 2 wherein said step of applying microwave energy further comprises the step of:

providing mode homogenizing hardware for uniform microwave field intensity.

6. The method for sealing a faceplate to a backplate of claim 1 wherein said step of applying microwave energy further comprises the steps of:

placing said faceplate and said backplate and said seal material in an inert environment; and applying said microwave energy such that said microwave energy is absorbed by said assembly.

7. The method for sealing a faceplate to a backplate of claim 1 wherein said step of applying microwave energy further comprises the steps of:

placing said faceplate and said backplate and said seal material in an evacuated environment; and applying said microwave energy such that said microwave energy is absorbed by said assembly.

8. The method for sealing a faceplate to a backplate of claim 1 further comprising the steps of:

providing an evacuation device, said evacuation device, said faceplate, said backplate and said seal material forming an enclosure therewithin;

evacuating said enclosure by applying suction to said evacuation device.

9. The method for sealing a faceplate to a backplate of claim 8 wherein said evacuation device further comprises an evacuation tube.

10. The method for sealing a faceplate to a backplate of claim 8 wherein said evacuation device further comprises an auxiliary chamber and an exhaust port.

11. The method for sealing a faceplate to a backplate of claim 7 further comprising the step of disposing an auxiliary chamber having a getter disposed therewithin such that outgassed species from said active area of said backplate and said active area of said faceplate are absorbed.

12. A flat panel display having a backplate including an active area and a faceplate including an active area comprising:

a seal disposed between said backplate and said faceplate and peripherally surrounding said active area said faceplate and peripherally surrounding said active area of said backplate so as to attach said backplate to said faceplate, said seal formed by the application of microwave energy to seal material.

13. The flat panel display of claim 12 wherein microwave energy having a frequency of between 10 and 300 gigahertz is used to melt said seal material.

14. The flat panel display of claim 12 wherein microwave energy having a frequency of between 20 and 30 gigahertz is used to melt said seal material.

15. The flat panel display of claim 14 wherein microwave energy having a power of 10–100 kilowatts is used to melt said seal material.

16. The flat panel display of claim 12 wherein an application specific fixture is placed around said flat panel display prior to the application of microwave energy so as to promote uniform heating of the desired areas of the display.

17. The flat panel display of claim 16 further comprising: an evacuation device.

18. The flat panel display of claim 13 wherein said microwave energy is applied using mode homogenizing hardware for uniform microwave field intensity.

19. A method for forming a flat panel display having an evacuated enclosure comprising:

a.) forming a faceplate including an active area having luminescent generating material disposed thereon;

b.) forming a backplate including an active area which includes electron emitting structures;

c.) placing seal material on said backplate such that said seal material is placed around said active area of said backplate;

d.) orienting said faceplate and said backplate such that said active area of said faceplate is aligned with said active area of said backplate;

e.) applying microwave energy to said seal material so as to melt said seal material and form an enclosure;

f.) evacuating said enclosure using an evacuation device; and g.) sealing said evacuation device so as to form a sealed enclosure.

20. The method for forming a flat panel display of claim 19 further comprising the step of:

placing application specific fixturing over said faceplate so as to promote uniform heating of the desired areas of the display.

21. The method for forming a flat panel display of claim 19 wherein step e.) further comprises:

placing said faceplate, said backplate, and said seal material in an evacuated environment; and wherein said step of applying microwave energy to said seal material is performed in said evacuated environment.

22. The method for forming a flat panel display of claim 19 wherein step e.) further comprises:

placing said faceplate, said backplate, and said seal material in an inert environment; and wherein said step of applying microwave energy to said seal material is performed in said inert environment.

23. The method for forming a flat panel display of claim 20 wherein step e.) further comprises:

applying a microwave energy having a frequency of between 10 and 300 gigahertz.

24. The method for forming a flat panel display of claim 20 further comprising the step of:

providing mode homogenizing hardware for uniform microwave field intensity.

25. The method for forming a flat panel display of claim 20 wherein step e.) further comprises:

applying a microwave energy having a frequency of at least 20 gigahertz and a power of 10–100 kilowatts.

26. A method for sealing a faceplate having an active area to a backplate having an active area using seal material, said seal material placed between said faceplate and said backplate such that said seal material is placed around said active area of said backplate and around said active area of said faceplate, said method comprising:

applying microwave energy to said seal material, said microwave energy melting said seal material so as to bond said faceplate to said backplate.

27. The method for sealing a faceplate having an active area to a backplate having an active area using seal material of claim 26 wherein said step of applying microwave energy further comprises:

providing mode homogenizing hardware for uniform microwave field intensity.

28. A microwave sealed flat panel display comprising:

a backplate including an active area;
a faceplate including an active area;
an evacuation device; and
a seal disposed between said backplate and said faceplate and peripherally surrounding said active area of said faceplate and peripherally surrounding said active area of said backplate so as to attach said backplate to said faceplate, said seal formed by the application of microwave energy to seal material.

29. The microwave sealed flat panel display of claim 28 wherein said evacuation device further comprises an auxiliary chamber and an exhaust port.

30. The microwave sealed flat panel display of claim 29 wherein said evacuation device further comprises an evacuation tube.

* * * * *

UNITED STATES PATENT AND TRADEMARK OFFICE
CERTIFICATE OF CORRECTION

PATENT NO. : 6,037,710          Page 1 of 1
DATED : March 14, 2000
INVENTOR(S) : H. Joe Poole, Paul N. Ludwig It is certified that error appears in the above-identified patent and that said Letters Patent is hereby corrected as shown below:

<u>Title page,</u>
Item [73] should read as follows:
Assignee: Candescent Technologies Inc., San Jose, California and Poole Ventura, Inc., Oxnard, California Signed and Sealed this Fourteenth Day of August, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,037,710  Page 1 of 1
DATED : March 14, 2000
INVENTOR(S) : H. Joe Poole and Paul N. Ludwig It is certified that error appears in the above-identified patent and that said Letters Patent is hereby corrected as shown below:

<u>Title page,</u>
Item [73], should read:
-- [73] Assignee: Candescent Technologies, Inc.,
San Jose, Calif.; Poole Ventura, Inc.;
Oxnard, Calif. --

Signed and Sealed this

Twenty-fifth Day of November, 2003

JAMES E. ROGAN
*Director of the United States Patent and Trademark Office*